United States Patent
Kawakami et al.

(10) Patent No.: US 8,236,865 B2
(45) Date of Patent: Aug. 7, 2012

(54) HYDROPHILIC VINYLIDENE FLUORIDE RESIN COMPOSITION AND METHOD FOR PRODUCTION THEREOF

(75) Inventors: Tomoaki Kawakami, Chiba-Ken (JP); Toshio Hosokawa, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 795 days.

(21) Appl. No.: 11/883,317

(22) PCT Filed: Jan. 30, 2006

(86) PCT No.: PCT/JP2006/301437
§ 371 (c)(1),
(2), (4) Date: Jul. 30, 2007

(87) PCT Pub. No.: WO2006/082778
PCT Pub. Date: Aug. 10, 2006

(65) Prior Publication Data
US 2008/0249201 A1 Oct. 9, 2008

(30) Foreign Application Priority Data

Feb. 2, 2005 (JP) ................. 2005-026804

(51) Int. Cl.
*C08J 9/36* (2006.01)
*C04B 28/02* (2006.01)
*C08F 110/00* (2006.01)
*C08L 27/12* (2006.01)

(52) U.S. Cl. ............ 521/55; 521/143; 521/53; 525/200; 525/309; 525/934; 525/199

(58) Field of Classification Search ............... 521/55, 521/143, 53; 525/200, 309, 934, 199
See application file for complete search history.

(56) References Cited

U.S. PATENT DOCUMENTS

| | | | | |
|---|---|---|---|---|
| 3,790,645 A | * | 2/1974 | Murayama et al. | 525/276 |
| 5,109,086 A | * | 4/1992 | Watanabe et al. | 526/249 |
| 5,156,843 A | * | 10/1992 | Leong et al. | 424/411 |
| 5,349,003 A | | 9/1994 | Kato et al. | |
| 6,103,645 A | * | 8/2000 | Chang et al. | 442/173 |
| 6,359,030 B1 | * | 3/2002 | Tsuda et al. | 523/201 |
| 6,551,708 B2 | * | 4/2003 | Tsuda et al. | 428/402 |
| 6,803,419 B2 | * | 10/2004 | Tsuda et al. | 525/197 |
| 2002/0144944 A1 | * | 10/2002 | Arcella et al. | 210/483 |
| 2005/0245708 A1 | * | 11/2005 | Tada et al. | 526/250 |

FOREIGN PATENT DOCUMENTS

| | | |
|---|---|---|
| JP | 50-116582 | 9/1975 |
| JP | 03-007784 | 1/1991 |
| WO | 99/21921 | 5/1999 |

* cited by examiner

Primary Examiner — Vasu Jagannathan
Assistant Examiner — Irina Krylova
(74) Attorney, Agent, or Firm — Wenderoth, Lind & Ponack, L.L.P.

(57) ABSTRACT

A hydrophilic vinylidene fluoride resin composition, comprising: porous vinylidene fluoride polymer particles and a hydrophilic polymer having a weight-average molecular weight of at least $2 \times 10^5$ contained in the pores of the porous vinylidene fluoride polymer particles. The composition is preferably obtained by subjecting a slurry containing porous vinylidene fluoride polymer particles after suspension polymerization to an appropriate degree of heat treatment for adjusting the amount of residual polymerization initiator, then impregnating the Polymer particles with a hydrophilic monomer and polymerizing the monomer. The thus-obtained vinylidene fluoride resin composition exhibits persistent hydrophilicity and good processability.

11 Claims, No Drawings

HYDROPHILIC VINYLIDENE FLUORIDE RESIN COMPOSITION AND METHOD FOR PRODUCTION THEREOF

TECHNICAL FIELD

The present invention relates to a vinylidene fluoride resin composition excellent in persistent hydrophilicity and processability and a process for production thereof.

BACKGROUND ART

Vinylidene fluoride resin is excellent in chemical resistance, weatherability, wear resistance, electrical properties, etc. and also has good processability, so that it is used as materials for various purposes. However, as vinylidene fluoride resin is a hydrophobic resin having a low surface energy, it is accompanied with problems, such as inferior adhesiveness with other parts or materials and adhesion of soils thereto, depending on some use thereof. Accordingly, various means for hydrophilization thereof have been proposed. For example, Patent document 1 listed below has disclosed a means for hydrophilization according to chemical treatment, but it is not only costly and troublesome but also liable to impair the characteristic properties of vinylidene fluoride resin. Patent document 2 below discloses a means of copolymerization with a hydrophilic monomer but the species and amount of such copolymerizable monomers are limited. Further, Patent document 3 below discloses a mixture with another hydrophilic resin, but it is difficult to obtain a uniform mixture. From a viewpoint of improving the homogeneousness of a mixture, there has been proposed a composition obtained by adding another monomer to a polymerization vessel after suspension polymerization of vinylidene fluoride and polymerizing the added monomer by utilizing a polymerization initiator remaining in vinylidene fluoride polymer particles (Patent document 4 below), but this is for the purpose of controlling the crystallinity of vinylidene fluoride resin, and no attention has been paid to provision and persistency of hydrophilicity.

Patent document 1: JP-A 2004-230280
Patent document 2: JP-B 3121943
Patent document 3: JP-B 3200095
Patent document 4: JP-B 52-38586

DISCLOSURE OF INVENTION

In view of the above-mentioned problems of the prior art, it is a principal object of the present invention to provide a vinylidene fluoride resin composition having hydrophilicity more persistent than ever and also excellent processability, and a process for production thereof.

As a result of the present inventions' study for accomplishing the above object, the production technique for providing a uniform vinylidene fluoride resin composition disclosed in the above-mentioned Patent document 4 has been found also applicable to polymerization of a hydrophilic monomer impregnating vinylidene fluoride polymer particles, and it has been confirmed that as a result thereof, a hydrophilic vinylidene fluoride resin composition having good processability (hot kneadability) can be obtained. However, the hydrophilicity of a vinylidene fluoride resin composition obtained in this manner is not persistent. More specifically, when a shaped product thereof is immersed in (hot) water for a (long) period, the hydrophilicity thereof is gradually lowered, i.e., the contact angle with water is gradually increased (See Comparative Examples described hereinafter). As a result of the present inventors' further study in this respect, it has been found that the non-persistency of hydrophilicity of the composition is attributable to an excessive amount of initiator remaining in vinylidene fluoride polymer particles after the first-step polymerization so that the molecular weight of the hydrophilic polymer polymerized in the particles is lowered and the contact of the polymer with an aqueous medium for a long period results in elution of the polymer in the aqueous medium. Such a polymer of a relatively low molecular weight is excellent in mutual solubility with vinylidene fluoride and effective for adjusting the crystallinity thereof, but is not suitable for provision of persistent hydrophilicity according to incorporation of a hydrophilic polymer. However, the present inventors have acquired a knowledge that if the impregnation and polymerization of a hydrophilic monomer are performed after adjustment of amount of the initiator remaining in vinylidene fluoride polymer particles, it becomes possible to obtain a hydrophilic polymer of a higher molecular weight and provide a vinylidene fluoride resin composition exhibiting persistent hydrophilicity.

The hydrophilic vinylidene fluoride resin composition of the present invention is based on the above knowledge and, more specifically, comprises: porous vinylidene fluoride polymer particles and a hydrophilic polymer having a weight-average molecular weight of at least $2 \times 10^5$ contained in the pores of the porous vinylidene fluoride polymer particles.

Further, the process for producing a hydrophilic vinylidene fluoride resin composition of the present invention is an efficient process for producing the above-mentioned hydrophilic vinylidene fluoride resin composition of the present invention and, more specifically, comprises: heat-treating, at 65-100° C., porous vinylidene fluoride polymer particles obtained by suspension polymerization of vinylidene fluoride, then impregnating pores of the porous vinylidene fluoride polymer particles with a monomer having a hydrophilic group and an unsaturated double bond, and polymerizing the monomer.

BEST MODE FOR PRACTICING THE INVENTION

Hereinbelow, the present invention will be described in further detail with respect to preferred embodiments thereof. "Parts" and "%" used in the following description for indicating compositions or quantity ratios are by weight unless otherwise noted specifically.

The hydrophilic vinylidene fluoride resin composition of the present invention can also be produced by using a commercially available, dry vinylidene fluoride polymer particles as a starting material, re-dispersing the polymer particles into an aqueous medium to form a dispersion system, and adding to the system and polymerizing a hydrophilic monomer containing an additional initiator. This is effective for a case of providing an ultra-high molecular weight in terms of a weight-average molecular weight of, e.g., at least $5 \times 10^6$, to a hydrophilic polymer formed by polymerization of a monomer impregnating vinylidene fluoride polymer particles (hereinafter, simply referred to as "impregnation polymerization") (that is, a case of polymerization with an accurately controlled small amount of additional initiator), a case of using an initiator different from the initiator used in polymerization of vinylidene fluoride, or a case wherein reagents used for vinylidene fluoride polymerization are unnecessary. For this mode of polymerization, however, a preliminary step of wetting dried vinylidene fluoride polymer particles with an alcohol, etc., to improve the affinity thereof with the aqueous medium and monomer, becomes necessary, so that a lowering of process efficiency is inevitable. Accordingly, except for a special case of, e.g., requiring an ultra-high molecular weight hydrophilic polymer, it is preferred to follow the production process according to the present invention wherein a hydrophilic monomer is added to an aqueous dispersion system including vinylidene fluoride polymer particles obtained by suspension polymerization and subjected to polymerization by utilizing a polymerization initiator remaining in the vinylidene fluoride polymer particles (hereinafter, simply referred to as "intra-particle polymerization").

Hereinafter, some characteristic features of the present invention will be described in the order of steps involved in the process for producing a hydrophilic vinylidene fluoride resin composition according to the present invention.

The vinylidene fluoride used in the present invention may include homopolymer of vinylidene fluoride i.e., polyvinylidene fluoride, and also a copolymer of vinylidene fluoride with another monomer copolymerizable therewith. The monomer copolymerizable with vinylidene fluoride may comprise one or more species of fluorine-containing monomers, such as tetrafluoroethylene, hexafluoropropylene, trifluoroethylene, trifluorochloroethylene and vinyl fluoride, and fluorine-non-containing monomers, such as ethylene, monomethyl maleate, and allyl glycidyl ether. The vinylidene fluoride polymer may preferably comprise at least 70 mol % of vinylidene fluoride units as a constituent. Such vinylidene fluoride polymers may preferably be used selectively depending on their use, e.g., homopolymer consisting of 100 mol % of vinylidene fluoride for a use requiring mechanical strength or chemical resistance, or a copolymer comprising at least 70 mol % of vinylidene fluoride for a use requiring flexibility.

Generally, in the suspension polymerization for forming such vinylidene fluoride polymer particles, 100 parts of vinylidene fluoride alone or a mixture thereof with a monomer copolymerizable therewith and 0.1-1 part of a polymerization initiator are suspended in 100-400 parts, preferably 200-300 parts, of an aqueous medium optionally containing ca. 0.01-0.1 part of a suspension agent, such as methyl cellulose. The polymerization initiator may preferably have a 10 hour-half-life temperature $T_{10}$ of 30-90° C. Preferred examples thereof may include: dinormal propyl peroxydicarbonate ($T_{10}$=40.3° C.), diisopropyl peroxydicarbonate ($T_{10}$=40.5° C.) and tertiary-butyl peroxypivalate ($T_{10}$=54.6° C.). The polymerization may preferably be performed at a temperature of $T_{10}$−20° C. to $T_{10}$+30° C. for ca. 3-50 hours. By using a known chain transfer agent, such as ethyl acetate, as desired, it is possible to obtain a slurry containing vinylidene fluoride polymer particles having an inherent viscosity η (i.e., a logarithmic viscosity at 30° C. of a solution formed by dissolving 4 g of polymer in 1 liter of N,N-dimethylformamide) corresponding to an average molecular weight of ca. 0.5-5 dl/g and an average particle size (accumulative 50 wt. %-particle size) of ca. 70-300 μm.

Then, into the vinylidene fluoride polymer slurry obtained in the above-described manner, a hydrophilic monomer is added to effect intra-particle polymerization. Preceding it, however, the vinylidene fluoride polymer slurry may be heat-treated at 65-100° C. for 0.5-4 hours, preferably at 70-90° C. for 1-3 hours according to the process for producing a hydrophilic vinylidene fluoride resin composition so as to provide the resultant hydrophilic polymer with a weight-average molecular weight Mw (which can be confirmed as an MW based on polymethyl methacrylate of a soluble extracted component from the composition with, e.g., tetrahydrofuran or hexafluoroisopropanol) of at least $2\times10^5$, preferably at least $3\times10^5$. This is because, if an amount of polymerization initiator remaining in the vinylidene fluoride polymer particles after polymerization using the above-mentioned amount of polymerization initiator required for providing a vinylidene fluoride polymer having a level of inherent viscosity as described above within an appropriate period of polymerization is used as it is for the intra-particle polymerization, the resultant hydrophilic polymer is caused to have too small a molecular weight, thus failing to provide a persistent hydrophilicity. It is also possible to apply an excessive heat-treatment to reduce the residual polymerization initiator and adding a desired initiator anew. The polymerization initiator added later may be either the same as or different from the initially used initiator.

As the hydrophilic monomer, a monomer having at least one hydrophilic group selected from ester group, hydroxy group, carboxy group, epoxy group, ether group, sulfonic acid group, amino group, amide group and acid anhydride group, in addition to an unsaturated double bond. Examples of ester group-containing monomers may include: carboxylate esters, such as vinyl acetate, vinyl propionate and methyl (meth)acrylate, and also carbonate esters, such as vinylene carbonate. Examples of hydroxy group-containing monomers may include: hydroxyethyl (meth)acrylate. Examples of carboxy group-containing monomers may include: monoethyl maleate, monomethyl citraconate, monoethyl citraconate and (meth)acrylic acid. Examples of epoxy group-containing monomers may include: glycidyl (meth)acrylate and allyl glycidyl ether. Examples of ether group-containing monomers may include: (poly)ethylene glycol (meth)acrylate and perfluorovinyl ether. Examples of sulfonic acid group-containing monomers may include: vinylsulfonic acid, acrylsulfonic acid and styrenesulfonic acid. Examples of amino group-containing monomers may include: allyl amine and (meth)acrylamide. Examples of amide group-containing monomers may include: N-(3-dimethylaminopropyl)-acrylamide, N-(3-dimethylaminopropyl)-acrylamide, N-isopropylacrylamide, and also monomers formed by replacing a hydrogen atom in amide group with an alkyl group or a vinyl group, such as N,N-dimethylacrylamide, N-isopropylacrylamide, N,N-diethylacrylamide, N,N-dimethylaminoethyl acrylate and N-vinylphthalimide. Examples of acid anhydride group-containing monomers may include: maleic anhydride and citraconic anhydride. Incidentally, the above-enumerated examples include monomers having a plurality of functional groups (e.g., epoxy group and ether group), such as allyl glycidyl ether. These hydrophilic monomers may be used singly or in a plurality for copolymerization. A hydrophobic monomer free from functional group as described above can be copolymerized up to 20% in consideration of a balance of hydrophilicity and polymerizability.

Further, a composition formed by intra-particle polymerization of an alkylene carboxylate ester, such as vinyl acetate, as a hydrophilic monomer may be used as it is or after saponification thereof to form a hydrophilic polymer having hydroxyl group as a hydrophilic group. Further, a hydrophilic polymer obtained by using a monomer having glycidyl group can be treated with water or sulfuric acid to convert the glycidyl group into hydroxyl group.

The hydrophilic polymer suitably formed by intra-particle polymerization in the present invention may be one providing a shaped product formed by itself exhibiting a contact angle with pure water of at most 70 degrees, particularly at most 60 degrees as measured by a method described hereinafter. For the purpose of the present invention, the lower limit of the contact angle is not particularly restricted but may ordinarily be at least 20 degrees, particularly 30 degrees or higher.

The intra-particle polymerization may generally be performed by adding 5-200 parts, preferably 10-150 parts, of the above-mentioned hydrophilic monomer per 100 parts of the vinylidene fluoride polymer particles. In general, if the hydrophilic monomer is below 5 parts, it is difficult to obtain a composition having effective hydrophilicity, and in excess of 200 parts, the particles are liable to cause agglomeration during the polymerization, thus failing to provide a uniform composition.

It is also possible to co-use a poly-functional crosslinking agent having a plurality of unsaturated double bonds. The crosslinking agent may preferably have a hydrophilic group as described above, and examples thereof may include: divinyl adipate, vinyl methacrylate, vinyl crotonate; polyfunctional methacrylates, such as (poly)ethylene glycol dimethacrylate, 1,3-butylene glycol dimethacrylate, 1,6-hexanediol dimethacrylate, neopentyl glycol dimethacrylate, (poly)propylene glycol dimethacrylate, and 2-hydroxy-1,3-dimetheryloxypropane; and polyfunctional acrylates, such as (poly)ethylene glycol diacrylate, 1,6-hexanediol diacrylate and allyl acrylate. The crosslinking agent may suitably be used in an amount of ca. 0.1-2% with respect to the total with the hydrophilic monomer. By crosslinking the hydrophilic polymer, it is possible to increase the moisture resistance and persistency of the hydrophilicity.

The intra-particle polymerization temperature may suitably be 20-80° C., preferably 30-70° C.

After completion of the above-mentioned intra-particle polymerization, particles are recovered from the polymer slurry to obtain a hydrophilic and water-resistant vinylidene fluoride resin composition in an average particle size of ca. 70-350 µm, which exhibits good processability and formability, as by hot melt-forming or pressing, etc., and preferably exhibits a contact angle with pure water of at most 70 degrees, preferably at most 60 degrees (and ordinarily at least 20 degrees, particularly at least 30 degrees). The vinylidene fluoride resin composition may suitably be used as adhesive members, anti-staining building materials, water-processing materials, and particularly as materials for shaped products having a relatively large area of contact with water compared with their mass by taking advantage of its water resistance. The good persistency of hydrophilicity of the composition may be confirmed, e.g., by a substantially constant contact angle (of at most 70 degrees, preferably at most 60 degrees) before and after immersion in hot water for a prescribed period (e.g., in water at 85° C. for 100 hours) of a pressed sheet thereof, and the good water resistance of the composition may be confirmed by a weight loss of at most 10% of the hydrophilic polymer after extraction by immersion in water at 85° C. for 50-100 hours of a pressed sheet of the composition.

As different from the composition of the present invention, when a vinylidene fluoride polymer and a hydrophilic polymer are simply mixed, these polymers cannot be uniformly melt-mixed together only by melting in a forming process, and they are liable to cause phase separation from each other in the processing to provide only a non-uniform shaped product. In fact, during measurement of melt flow rate (MFR), a vinylidene fluoride resin composition of the present invention provided a strand in a constant diameter, whereas such a mixture of a vinylidene fluoride resin and a hydrophilic polymer failed to provide a stable strand (described hereinafter as Reference Example).

The vinylidene fluoride resin composition of the present invention or a shaped product thereof exhibits a further increased hydrophilicity, when treated with a base solution. More specifically, the hydrophilic polymer in the resin composition of the present invention has at least one hydrophilic group, such as hydroxy group —OH, carboxy group —COOH or epoxy group —C(O)C—, which is changed to its ionic form —O$^-$ or —O$^-$M$^+$, or ionic form —COO$^-$ or —COO$^-$M$^+$ (wherein M$^+$ denotes a counter cation) when treated with a base solution, thereby showing an enhanced hydrophilicity and providing an improved hydrophilicity of the shaped composition, accordingly. The base solution may preferably be one showing a pH of at least 12 and may for example be provided as an aqueous solution or an alcoholic solution (alcoholate) of a hydroxide of an inorganic alkali (earth) metal, such as sodium hydroxide, potassium hydroxide or calcium hydroxide, ammonia water, or an organic amine, such as methylamine or dimethylamine and used at an elevated temperature, as desired.

EXAMPLES

Hereinbelow, the present invention will be described more specifically based on Examples and Comparative Examples. The properties described herein including the following description are based on values measured according to the following methods.

(Quantitative Analysis of Hydrophilic Polymer in Intra-Particle Polymerization Product).

A sample intra-particle polymerization product was accurately weighed at 20 mg and heated at a temperature-raising rate of 10° C./min. in a nitrogen atmosphere by using a thermogravimetric analyzer ("TGA/STTA851", made by Mettler Toledo Co.) to measure a thermal decomposition weight loss of the sample. A weight loss corresponding to a decomposition peak for a hydrophilic polymer (e.g., one appearing at ca. 350° C. for polyvinyl acetate) appearing at a lower temperature side than 480° C. giving a PVDF decomposition peak was assumed to be caused by elimination of the hydrophilic polymer branches, thereby calculating the weight part(s) of the hydrophilic polymer with respect to 100 wt. parts of PVDF.

(Weight-Average Molecular Weight of Hydrophilic Polymer)

A sample intra-particle polymerization product was dissolved in 5 ml of HFIP (hexafluoroisopropanol) per 0.005 g of the sample, and a supernatant liquid containing the extracted hydrophilic polymer (at a concentration of at least ca. 10%) was injected into a GPC apparatus ("Shodex-104" with 2 columns of "HFIP-M" together with a pre-column connected in series) to measure a weight-average molecular weight Mw based on PMMA (polymethyl methacrylate) of the hydrophilic polymer in the intra-particle polymerization product.

(Contact Angle)

A pressed sheet of a sample resin (composition) formed by hot pressing at 230° C. was subjected measurement of contact angle with pure water (having a resistivity of at least 1 MΩ·cm) at room temperature by using a contact angle meter ("FACE CONTACT-ANGLE-METER CA-D", made by KYOWA Kaimen Kagaku K.K.).

(Test for Persistency of Hydrophilicity)

A sheet of sample resin (composition) formed by pressing at 240° C. was cut into a sheet with sizes of ca. 40 mm×20 mm×0.3 mm, which was placed in a polypropylene-made container (inner volume: 100 ml, weight: ca. 18 g, trade name: "AIBOY", made by AS ONE CORPORATION) for rinsing in pure water, followed by immersion in 100 ml of pure water (having a resistivity of at least 1 MΩ·cm) at 85° C. After a prescribed period, the cut sheet was subjected to measurement of a contact angle and measurement of the hydrophilic polymer weight based on thermogravimetric loss according to the above-described section of (Quantitative analysis of hydrophilic polymer in intra-particle polymerization product), whereby the reduced weight of the hydrophilic polymer compared with the initial value was determined as an elution percentage.

The above-measurement was repeated for immersion periods of 50 hours and 100 hours.

Example 1

Into an autoclave having an inner volume of 10 liter, 7693 g of deionized water, 0.902 g of methyl cellulose, 25.75 g of dinormal peroxydicarbonate and 3005 g of vinylidene fluoride were charged and subjected to 26 hours of suspension polymerization at 26° C., followed by removal of the residual monomer by purging to terminate the polymerization and de-watering to obtain Polymer powder slurry (1). Polymer powder slurry after the dehydration exhibited a water content of ca. 30 wt. %.

Into an autoclave having an inner volume of 3 liter, 571 g of Polymer powder slurry (1) obtained above was charged together with 853 g of deionized water and heated at 75° C. for 2 hours. After the temperature was lowered to 35° C., 120 g of vinyl acetate monomer was charged and subjected to 7 hours of polymerization. After the polymerization, the product was dewatered, washed with water and dried at 80° C. for 20 hours to obtain Polymer powder (2) of ca. 160 μm in average particle size, as a vinylidene fluoride resin composition of the present invention. As a result of the quantitative analysis, Polymer powder (2) was determined to contain 24.4 wt. % of intra-particle polymer (hydrophilic polymer), the extract of which exhibited a weight-average molecular weight of $9.13 \times 10^5$. Polymer powder (2) exhibited a contact angle with water of 50 degrees and also good persistency of the hydrophilicity.

The intra-particle polymerization conditions and the outline of the polymerization product are summarized in Table 1 appearing hereinafter together with the results of Examples and Comparative Examples described below.

Polymer powder (2) obtained above was subjected to a measurement of MFR (melt flow rate, at 270° C., 36 kg-f) by using an MFR meter ("Meltfixer Type 556-0040", made by Thermo Haake Co. (Germany), whereby a uniform stable strand was formed to give an MFR value of 18.3 g/10 min.

Reference Example 100 g of a commercially available polyvinylidene fluoride powder ($\eta_i$=1.45 dl/g) obtained by drying Polymer powder slurry (1) obtained in the same manner as in Example 1 was sufficiently blended with polyvinyl acetate pellet ("JMR-150L", made by Nippon Sakubi-Poval K.K.; Mw=$4\times10^5$) to form a mixture. The mixture was then subjected to MFR measurement under the same conditions as in Example 1, whereby the discharge rate could not be stabilized but severely surged so that an accurate MFR measurement was abandoned.

Example 2

Into an autoclave having an inner volume of 3 liter, 571 g of Polymer powder slurry (1) obtained in the same manner as in Example 1 was charged together with 853 g of deionized water and heat-treated at 70° C. for 30 minutes and then at 75° C. for 1.5 hours. After the temperature was lowered to 35° C., 60 g of vinyl acetate monomer was charged and subjected to 7 hours of polymerization. After the polymerization, the polymer particles were dewatered, washed with water and dried at 80° C. for 20 hours to obtain Polymer powder (3), as a vinylidene fluoride resin composition of the present invention.

Example 3

Into an autoclave having an inner volume of 3 liter, 571 g of Polymer powder slurry (1) was charged together with 853 g of deionized water and heat-treated at 70° C. for 2 hours. After the temperature was lowered to 35° C., 60 g of vinyl acetate monomer was charged and subjected to 7 hours of polymerization. After the polymerization, the polymer particles were dewatered, washed with water and dried at 80° C. for 20 hours to obtain Polymer powder (4), as a vinylidene fluoride resin composition of the present invention.

Comparative Example 1

Into an autoclave having an inner volume of 3 liter, 571 g of Polymer powder slurry (1) was charged together with 853 g of deionized water and heat-treated at 60° C. for 2 hours. After the temperature was lowered to 35° C., 90 g of vinyl acetate monomer was charged and subjected to 7 hours of polymerization. After the polymerization, the polymer particles were dewatered, washed with water and dried at 80° C. for 20 hours to obtain Polymer powder (5), as a comparative example of vinylidene fluoride resin composition.

Example 4

Into an autoclave having an inner volume of 3 liter, 571 g of Polymer powder slurry (1) was charged together with 853 g of deionized water and heat-treated at 70° C. for 2 hours. After the temperature was lowered to 35° C., 90 g of 2-hydroxyethyl methacrylate was charged and subjected to 7 hours of polymerization. After the polymerization, the polymer particles were dewatered, washed with water and dried at 80° C. for 20 hours to obtain Polymer powder (6).

Comparative Example 2

Into an autoclave having an inner volume of 3 liter, 571 g of Polymer powder slurry (1) was charged together with 853 g of deionized water and 90 g of 2-hydroxyethyl methacrylate, and polymerization was performed at 35° C. for 7 hours. After the polymerization, the polymer particles were dewatered, washed with water and dried at 80° C. for 20 hours to obtain Polymer powder (7).

Example 5

Into an autoclave having an inner volume of 3 liter, 571 g of Polymer powder slurry (1) was charged together with 853 g of deionized water and heat-treated at 75° C. for 2 hours. After the temperature was lowered to 50° C., 40 g of methacrylic acid, 20 g of methyl methacrylate, 0.15 g of allyl methacrylate, 10 g of 5 wt. %-hydrochloric acid aqueous solution (as a pH adjusting agent) and 0.02 g of sodium nitrite (as an aqueous phase polymerization inhibitor) were charged and subjected to 20 hours of polymerization. After the polymerization, the product was dewatered, washed with water and dried at 80° C. for 2 hours to obtain Polymer powder (8), which exhibited a contact angle with water of 65 degrees. When a pressed sheet of Polymer powder (8) was once subjected to a base solution treatment by immersion in a 5 wt. %-sodium hydroxide aqueous solution at 50° C. for 2 hours, the pressed sheet showed a contact angle with water of 30 degrees, which was retained even after 100 hours of immersion in pure water at 85° C.

The intra-particle polymerization conditions and the results of evaluation of polymer products of the above Examples and Comparative Examples are inclusively shown in the following Table 1.

TABLE 1

| | | Example | | | | | | |
|---|---|---|---|---|---|---|---|---|
| Item | | 1 | 2 | 3 | Comp. 1 | 4 | Comp. 2 | 5 |
| Intra-particle polymerization | Slurry heating conditions | 75° C. · 2 hrs | 70° C. · 0.5 hr + 75° C. · 1.5 hrs | 70° C. · 2 hrs | 60° C. · 2 hrs | 70° C. · 2 hrs | none | 75° C. · 2 hrs |
| | Monomer *1 | VAc | VAc | VAc | VAc | HEMA | HEMA | MAA + MMA + ALMA |
| | Charge weight ratio: PVDF/monomer | 100/30 | 100/15 | 100/15 | 100/22.5 | 100/22.5 | 100/22.5 | 100/15 |
| | Weight ratio in polymer product: PVDF/hydrophilic polymer | 100/24.4 | 100/12.1 | 100/12.9 | 100/15.5 | 100/17.5 | 100/11.2 | 100/14.8 |
| Hydrophilic polymer (extract with HFIP) | Extracted percentage of hydrophilic polymer (%) | 65.0 | 52.0 | 60.9 | 75.4 | 76.0 | 80.7 | 3.4 |
| | Mw of extract (×$10^4$) | 91.3 | 49.7 | 30.8 | 16.1 | 66.3 | 12.7 | 54.8 |
| Persistency of hydrophilicity | Eluted percentage of hydrophilic polymer (%) | | | | | | | |
| (after immersion in pure water at 85° C.) | 50 hrs of immersion | 2.3 | 3.3 | 5.6 | 12.0 | 4.3 | 25.5 | 0.1 |
| | 100 hrs of immersion | 2.9 | 4.4 | 7.1 | 19.3 | 5.2 | 29.6 | 0.1 |
| | Contact angle *2 | | | | | | | |
| | no immersion | 50 | 50 | 50 | 50 | 50 | 50 | 65 (30) |
| | 50 hrs of immersion | 50 | 50 | 50 | 65 | 50 | 60 | 65 (30) |
| | 100 hrs of immersion | 50 | 50 | 55 | 75 | 55 | 80 | 65 (30) |

*1: VAc: vinyl acetate
HEMA: 2-hydroxyethyl methacrylate
MAA: methacrylic acid
MMA: methyl methacrylate
ALMA: allyl methacrylate
*2: Values in ( ) for Example 5 represent contact angles after treatment with a base solution.

INDUSTRIAL APPLICABILITY

As is apparent from the results of Examples and Comparative Examples shown in Table 1 above, the present invention provides a vinylidene fluoride resin composition excellent in both persistent hydrophilicity and processability, and also an efficient process for production thereof.

The invention claimed is:

1. A process for producing a particulate hydrophilic vinylidene fluoride resin composition, comprising:
  polymerizing vinylidene fluoride by way of suspension polymerization in the presence of a polymerization initiator having a 10-hour-half-life temperature $T_{10}$ of 30-90° C. at a temperature of $T_{10}$−20° C., to $T_{10}$+30° C. to produce porous vinylidene fluoride polymer particles having an average particle size of 70-300 μm,
  heat-treating the porous vinylidene fluoride polymer particles at a heat-treating, temperature of 70-100° C. for 1-4 hours, to reduce an amount of the polymerization initiator remaining in the porous vinylidene fluoride polymer particles alter the suspension polymerization,
  then impregnating pores of the porous vinylidene fluoride polymer particles with a monomer having a hydrophilic group and an unsaturated double bond, and
  polymerizing the monomer at a temperature of 20-80° C. in the presence of the reduced amount of the polymerization initiator remaining in the porous vinylidene fluoride polymer particles and in the absence of an additional polymerization initiator to provide a polymer of the monomer having a weight-average molecular weight of $3 \times 10^5$ to $9.13 \times 10^5$ contained in the pores of the porous vinylidene fluoride polymer particle,
  wherein the hydrophilic vinylidene fluoride resin composition exhibits a contact angle of at most 60 degrees before and after immersion in water at 85° C. for 100 hours and a weight loss of at most 10% of the hydrophilic polymer after extraction with water at 85° C. for 100 hours.

2. The process according to claim 1, wherein a crosslinking agent having a plurality of unsaturated double bonds is used for impregnation and polymerized together with the monomer having a hydrophilic group and a unsaturated double bond.

3. A particulate hydrophilic vinylidene fluoride resin composition, obtained according to the process of claim 1, comprising: an intra-particle polymerization product having an average particle size of 70-350 μm, which comprises porous vinylidene fluoride polymer particles having an average particle size of 70-300 μm and a hydrophilic polymer having a weight-average molecular weight $3 \times 10^5$ to $9.13 \times 10^5$ contained in the pores of the porous vinylidene fluoride polymer particles,
  wherein the hydrophilic vinylidene fluoride resin composition exhibits a weight loss of at most 10% of the hydrophilic polymer after extraction with water at 85° C. for 100 hours.

4. The resin composition according to claim 3, wherein the hydrophilic polymer has been formed by polymerization of monomer having impregnated the pores of the porous vinylidene fluoride polymer particles.

5. The resin composition according to claim 3, exhibiting a contact angle with water of at most 70 degrees.

6. The resin composition according to claim 3, wherein the hydrophilic polymer is a polymer of a monomer having at least one hydrophilic group selected from ester group, hydroxy group, carboxy group, epoxy group, ether group, sulfonic acid group, amino group, amide group and acid anhydride group, and also an unsaturated double bond.

7. The resin composition according to claim 3, wherein the hydrophilic polymer is further crosslinked.

8. A hydrophilic and water-resistant form product obtained by hot-melt forming of a particulate hydrophilic vinylidene fluoride resin composition according to claim 3.

9. The form product according to claim 8, which has been further treated with a base solution.

10. The process according to claim 1, wherein the porous vinylidene fluoride polymer particles having an average particle size of 70-300 μm is heat-treated at 70-90° C. for 1-3 hours.

11. The process according to claim 1, wherein the polymerization indicator is selected from the group consisting of dinormal propyl peroxydicarbonate ($T_{10}$=40.3° C.), diisopropyl peroxydicarbonate ($T_{10}$=40.5° C.) and tertiary-butyl peroxypivalate ($T_{10}$=54.6° C.).

* * * * *